(12) United States Patent
Guo et al.

(10) Patent No.: US 9,248,816 B2
(45) Date of Patent: Feb. 2, 2016

(54) HYDRAULIC UNIT WITH VARIABLE DAMPING

(75) Inventors: James Zhiqiang Guo, Charleston, SC (US); Omar Bravo, Summerville, SC (US); Christopher Theodore Yohpe, Summerville, SC (US); Joerg Fricke-Schmidt, Kleinmachnow (DE)

(73) Assignee: Robert Bosch GmbH, Stuttgart (DE)

( * ) Notice: Subject to any disclaimer, the term of this patent is extended or adjusted under 35 U.S.C. 154(b) by 797 days.

(21) Appl. No.: 13/367,791

(22) Filed: Feb. 7, 2012

(65) Prior Publication Data

US 2013/0200687 A1 Aug. 8, 2013

(51) Int. Cl.
*B60T 8/42* (2006.01)
*B60T 8/40* (2006.01)

(52) U.S. Cl.
CPC .............. *B60T 8/4291* (2013.01); *B60T 8/4068* (2013.01)

(58) Field of Classification Search
CPC ......... B60T 8/4068; B60T 13/14; B60T 8/36; F16F 9/535; F16F 13/305
USPC .................. 303/87, 115.2, DIG. 10, DIG. 11; 188/267.1, 267.2; 92/85 R; 138/30; 60/553
See application file for complete search history.

(56) References Cited

U.S. PATENT DOCUMENTS

| | | | | |
|---|---|---|---|---|
| 5,407,169 A | * | 4/1995 | Tournier | 267/140.11 |
| 5,540,486 A | * | 7/1996 | Linkner | 303/87 |
| 5,967,623 A | * | 10/1999 | Agnew | 303/87 |
| 5,993,358 A | * | 11/1999 | Gureghian et al. | 482/54 |
| 6,095,486 A | * | 8/2000 | Ivers et al. | 251/129.01 |
| 6,270,170 B1 | | 8/2001 | Isogai et al. | |
| 6,279,701 B1 | * | 8/2001 | Namuduri et al. | 188/267.2 |
| 6,336,535 B1 | * | 1/2002 | Lisenker | 188/267.2 |
| 8,020,946 B2 | * | 9/2011 | Iyatani | 303/119.1 |
| 2006/0209486 A1 | | 9/2006 | Fey et al. | |
| 2006/0224285 A1 | * | 10/2006 | Izawa et al. | 701/37 |
| 2007/0228820 A1 | * | 10/2007 | Nakamura | 303/119.3 |
| 2010/0199519 A1 | * | 8/2010 | Battlogg | 36/83 |
| 2010/0319334 A1 | | 12/2010 | Kley et al. | |
| 2012/0074348 A1 | | 3/2012 | Forehand et al. | |

FOREIGN PATENT DOCUMENTS

WO 96/13413 5/1996

OTHER PUBLICATIONS

Search Report for International Appl. No. PCT/US2013/021566, dated Jul. 23, 2013, 5 pages.
Written Opinion for International Appl. No. PCT/US2013/021566, dated Jul. 23, 2013, 6 pages.

(Continued)

*Primary Examiner* — Robert A Siconolfi
*Assistant Examiner* — Mahbubur Rashid
(74) *Attorney, Agent, or Firm* — Michael Best & Friedrich LLP

(57) ABSTRACT

A hydraulic unit for a braking system of a vehicle includes a body with actuator-side and brake-side ports. Inlet and outlet valves are positioned in the body and operable to selectively supply and relieve hydraulic fluid to/from the wheel cylinder of a brake via the brake-side port. A damper is positioned in the body for damping pressure pulsations in the hydraulic fluid. The damper is selectively operable in a first state having a first damping characteristic, and in a second state having a second damping characteristic different from the first damping characteristic.

19 Claims, 5 Drawing Sheets

(56) References Cited

OTHER PUBLICATIONS

Bonsor, Kevin, "How Smart Structures Will Work," webpages from HowStuffWorks, Feb. 2001, 4 pages, retrieved Dec. 7, 2011 from http://science.howstuffworks.com/engineering/structural/smart-structure2.htm.

Lord Corporation, Magneto-Rheolological -FAQs webpages, at least as early as Dec. 1999, 2 pages, retrieved Dec. 7, 2011 from http://www.lord.com/products-and-solutions/magneto-rheological-%28mr%29/faqs.xml.

Carlson, J. David, "Controlling Vibration with Magnetorheological Fluid Damping," webpages, Feb. 1, 2002, 4 pages, retrieved Dec. 7, 2011 from http://www.sensorsmag.com/sensors/electric-magnetic/controlling-vibration-with-magnetorheological-fluid-damping-999.

Laun, Hans Martin and Gabriel, Claus, "Measurement modes of the response time of a magneto-rheological fluid (MRF) for changing magnetic flux density," paper presented at Annual European Rheology Conference (AERC) held in Hersonisos, Crete, Greece on Apr. 27-29, 2006, published online Mar. 2007 in Rheol Acta journal, pp. 665-676, vol. 46, Springer-Verlag.

Goncalves, Fernando D., "Characterizing the Behavior of Magnetorheological Fluids at High Velocities and High Shear Rates," dissertation submitted to the Faculty of the Virginia Polytechnic Institute and State University in partial fulfillment of the requirements of the degree of Doctor of Philosophy in Mechanical Engineering, Jan. 2005, pp. i-xi, 1-103.

Butz, T. and Von Stryk, O., "Modelling and Simulation of Electro- and Magnetorheological Fluid Dampers," preprint of the paper which appeared in Zamm (J. of Appl. Math & Mech.) vol. 82, No. 1, pp. 3-20, 2002, accepted by ZAMM in Apr. 1998, first published in Jan. 2002, pp. 1-22.

Simon, Tammy and Reitich, Fernando, "Modeling and Computation of the Overall Magnetic Properties of Magnetorheological Fluids," Proceedings of the 36th Conference on Decision & Control, San Diego, California, Dec. 1997, pp. 3721-3726.

\* cited by examiner

HYDRAULIC UNIT WITH VARIABLE DAMPING

BACKGROUND

The present invention relates to braking system hydraulic units for vehicles. More particularly, the invention relates to hydraulic unit dampers.

Conventional braking system hydraulic units typically include one or more dampers for damping pressure pulsations in the hydraulic fluid. Damping the pressure pulsations by reducing the pulsation's amplitude or modifying its frequency dissipates energy that may otherwise lead to noise, vibration, and harshness (NVH) issues. These dampers often include a large damping chamber that provides a constant damping characteristic to reduce noise and vibration in the hydraulic system.

SUMMARY

Conventional dampers can be relatively effective, but due to the large volume of fluid that is displaced for a given pressure, pumping efficiency can be impaired. Furthermore, the constant damping action reduces pressure pulsations even when the system pressure is low and damping is not needed. This further impairs system performance (e.g., pressure build).

The present invention provides an improved damper for a hydraulic unit that provides variable damping capability. Damping is controlled to target pressure peaks that may cause noise, vibration, or harshness issues. Overall system performance is improved in comparison to current constant damping systems.

In one aspect, the invention provides a hydraulic unit for a brake control system of a vehicle. The hydraulic unit includes a body with actuator-side and brake-side ports. Inlet and outlet valves are positioned in the body and are operable to selectively supply and relieve hydraulic fluid to/from the wheel cylinder of a brake via the brake-side port. A damper is positioned in the body for damping pressure pulsations in the hydraulic fluid. The damper is selectively operable in a first state having a first damping characteristic, and in a second state having a second damping characteristic different from the first damping characteristic.

In another aspect, the invention provides a method of operating a hydraulic braking system. The system includes a hydraulic unit with an inlet valve and an outlet valve operable to control a flow of hydraulic fluid to and from a wheel cylinder. The hydraulic unit further includes a damper in communication with the hydraulic fluid. The method includes selectively activating the inlet valve and the outlet valve to control the flow of hydraulic fluid to and from the wheel cylinder, configuring the damper in a first state having a first damping characteristic, and selectively re-configuring the damper to a second state having a second damping characteristic, based on a sensed pressure value of the hydraulic fluid.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
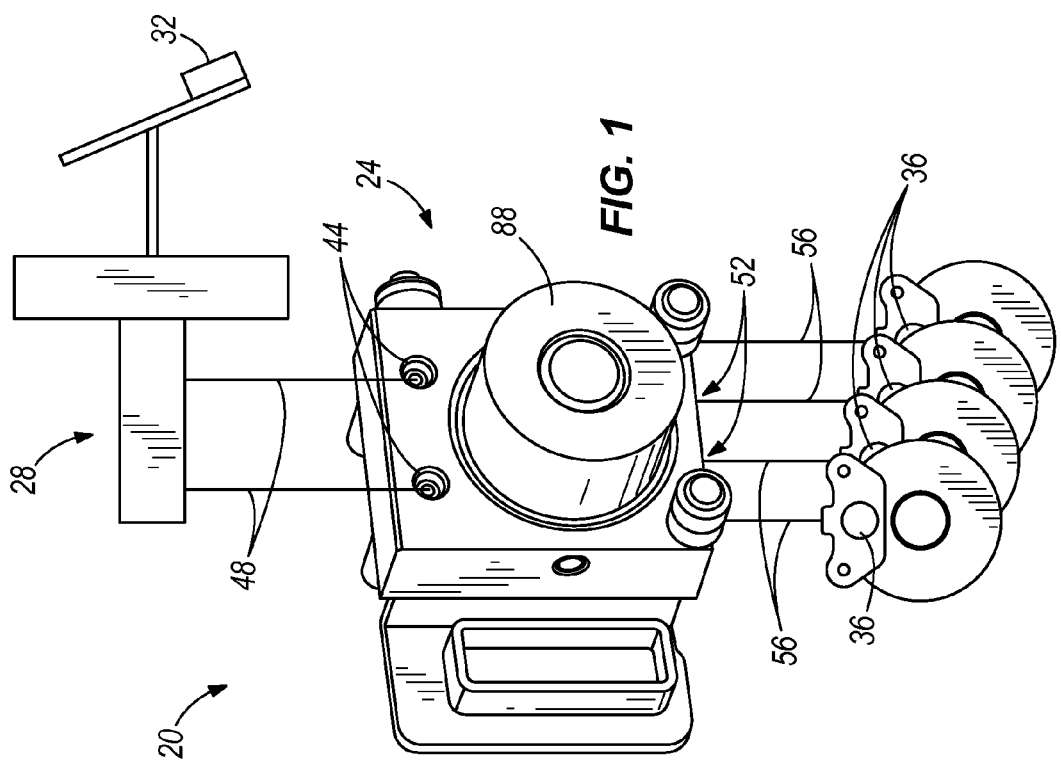
FIG. 1 is a perspective view of a hydraulic unit schematically represented in a vehicle braking system.

A braking system 20 (e.g., an anti-lock braking system—ABS) is shown in FIG. 1. The system 20 is provided in a wheeled vehicle for preventing wheel lockup and skidding under hard braking events or braking on low friction surfaces. The system 20 includes as its primary mechanical component a hydraulic unit 24 coupled between a brake master cylinder 28 (actuated by a user-operable brake pedal 32) and a plurality of wheel cylinders 36. Although the wheel cylinders 36 are shown in FIG. 1 as being incorporated with calipers of a disc braking system, other types of hydraulic braking systems may be provided at each of the wheels. The hydraulic unit 24 controls the selective relief of hydraulic fluid pressure from the wheel cylinders 36 so that a braking force just below the traction limit is maintained. A plurality of sensors (not shown) are coupled to a controller portion 40 (FIG. 3) of the hydraulic unit 24 to provide input information, typically regarding relative wheel speeds, so that the controller 40 can control the operation of the hydraulic unit 24. The hydraulic unit 24 may also be configured to provide brake force distribution and/or traction control as part of an overall electronic stability program (ESP) of the vehicle since many of the same hardware components are already provided by the system 20.

The hydraulic unit 24 includes a pair of fluid ports 44 for communicating hydraulic fluid back and forth with the master cylinder 28 along two brake lines 48. Additional fluid ports 52 of the hydraulic unit 24 and individual brake lines 56 are also provided for each respective wheel cylinder 36 of the system 20 so that hydraulic fluid can be exchanged back and forth between the hydraulic unit 24 and each individual wheel cylinder 36. The hydraulic unit 24 is shown in greater detail in FIGS. 2 and 3.

Figure 2:
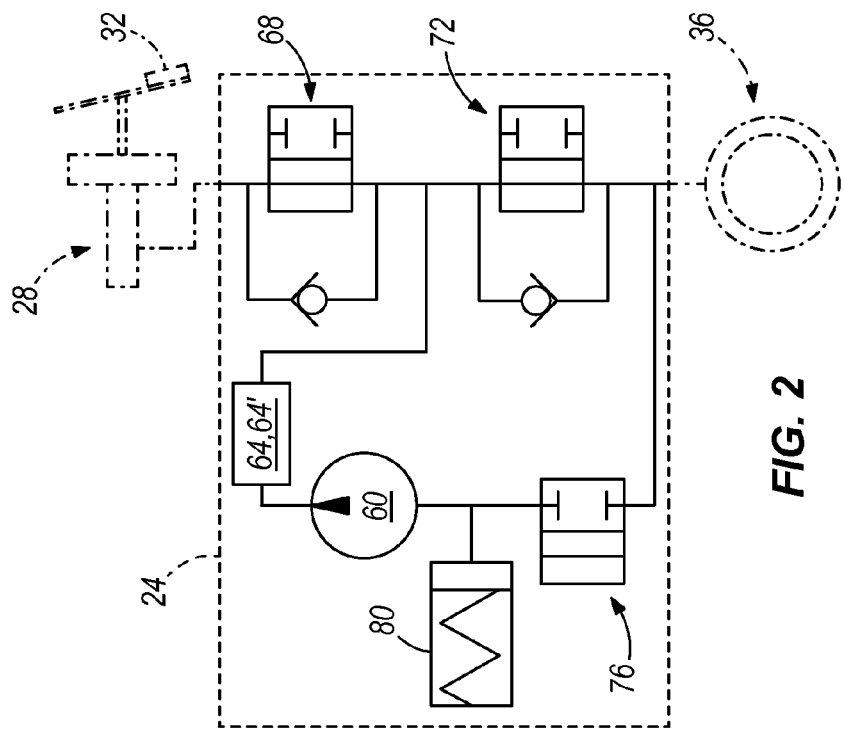
FIG. 2 is a schematic view of the hydraulic unit of FIG. 1.
Figure 3:
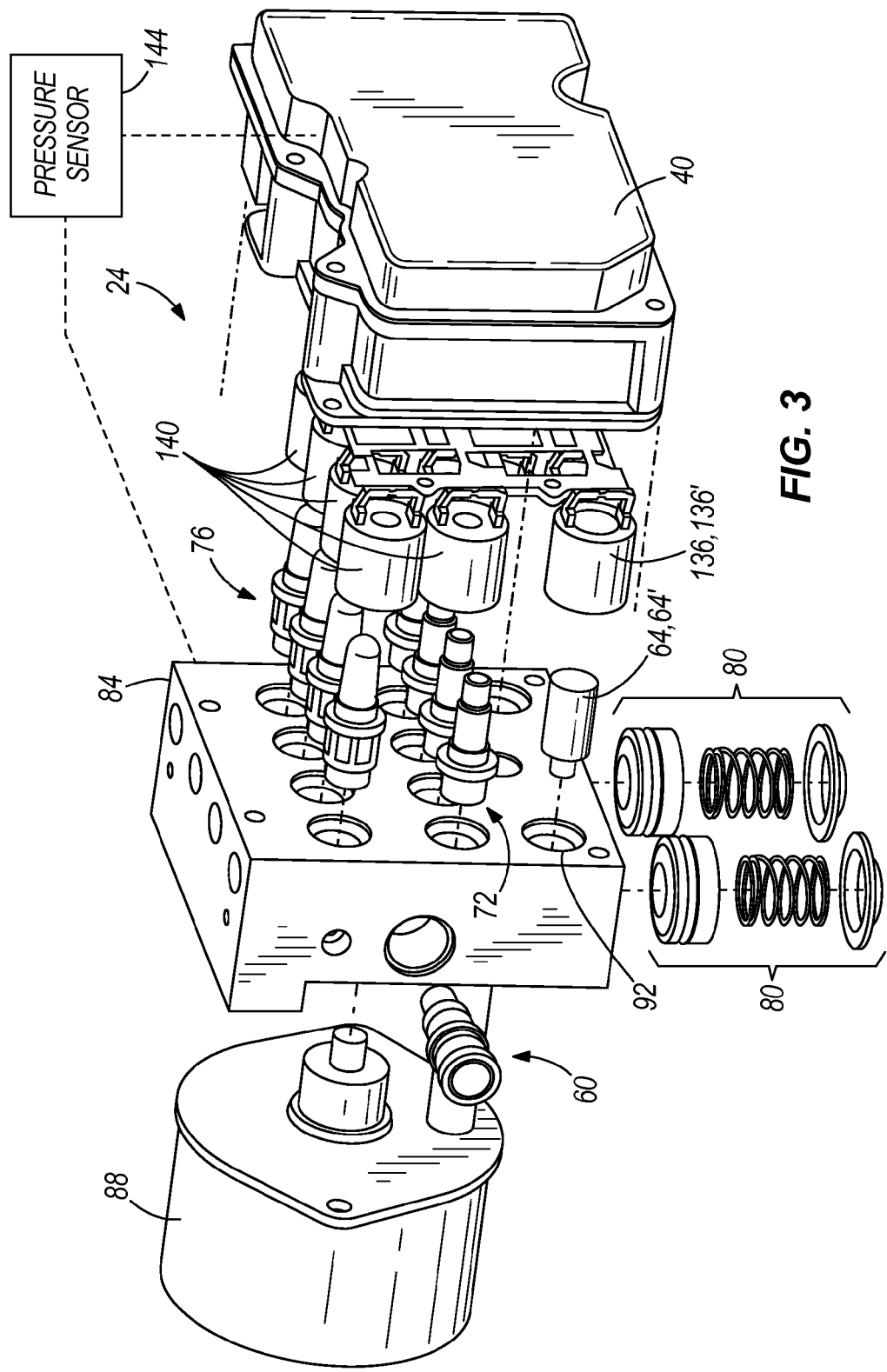
FIG. 3 is an exploded assembly view of the hydraulic unit.

Along with the external brake lines 48, 56, the hydraulic unit 24 defines a fluid circuit between the master cylinder 28 and each of the wheel cylinders 36. As shown in FIG. 2, the following elements are provided in each fluid circuit of the hydraulic unit 24: a pump 60, a damper 64, a suction control valve 68, an inlet valve 72, an outlet valve 76, and an accumulator 80. FIG. 2 is a basic schematic for one of the wheel cylinders 36, but it should be understood that components such as the inlet and outlet valves 72, 76 are individually provided for each wheel cylinder 36 as shown in FIG. 3, while other components may be shared among the circuits for the various wheel cylinders 36. For example, the hydraulic unit 24 of FIG. 3 (for the exemplary four wheel system 20) includes a housing or body 84. The body 84 can be a one-piece cast or machined block, for example of aluminum, but other materials and multi-piece configurations are optional.

One or more pump elements 60 are received within the body 84. Each pump element 60 is driven by a motor 88 coupled to the body 84. The body 84 also houses two accumulators 80. In the illustrated construction, each accumulator 80 is configured to receive hydraulic fluid from two of the wheel cylinders 36 through the respective outlet valves 76, but other configurations are optional. The body 84 also houses one or more dampers 64 (only one is shown in FIG. 3). The number and positioning of the dampers 64 can be varied as desired based on system requirements.

As shown in FIG. 3, each damper or damper element 64 is illustrated as being a self-contained element that is housed in a cavity or bore 92 formed in the body 84, much like the inlet and outlet valves 72, 76. The bore 92 is in communication with an internal fluid conduit or orifice within the body 84.

Although the basic operation of the system 20 will already be understood to one of ordinary skill in the art, it is briefly discussed below. When the brakes are actuated by the driver (via the pedal 32), hydraulic fluid is forced from the master cylinder 28 into the hydraulic unit 24 via the "actuator-side" ports 44. Hydraulic fluid is transmitted through the normally-open suction control valve 68 and the normally-open inlet valve 72 to the wheel cylinders 36 via the "brake-side" ports 52. The inlet valve 72 is operable between the open condition and a closed condition, which prevents excess pressure applied to the pedal 32 from being transmitted to the wheel cylinders 36. When the controller 40 determines that the brake-induced traction limit has been reached, the inlet valve(s) 72 are closed and the normally-closed outlet valve(s) 76 are opened to relieve hydraulic fluid from the wheel cylinder(s) 36 via the at least one brake-side port 52. The hydraulic fluid is directed into the corresponding accumulator 80 from which location it can later be pumped by the pump 60, through the damper 64 and the suction control valve 68, back to the master cylinder 28.

The damper 64 provides variable damping capability so that damping may be varied over a range of operating pressures, thereby providing beneficial noise reduction for different operating conditions of pumping speed and system pressure. Damping is electronically controlled to target pressure peaks that may cause noise, vibration, or harshness issues. The damping dissipates energy, thus reducing the pressure pulsation amplitude or modifying the frequency contents. The variable damping capability provides advantages over existing, constant damping dampers, in that constant damping reduces pressure pulsations even when the system pressure is low and large damping is not needed. This can impair system performance. The variable damper 64 can be selectively and electronically controlled to only damp the pressure peaks that cause NVH issues so that unnecessary damping is avoided and system performance is improved.

Figure 4:
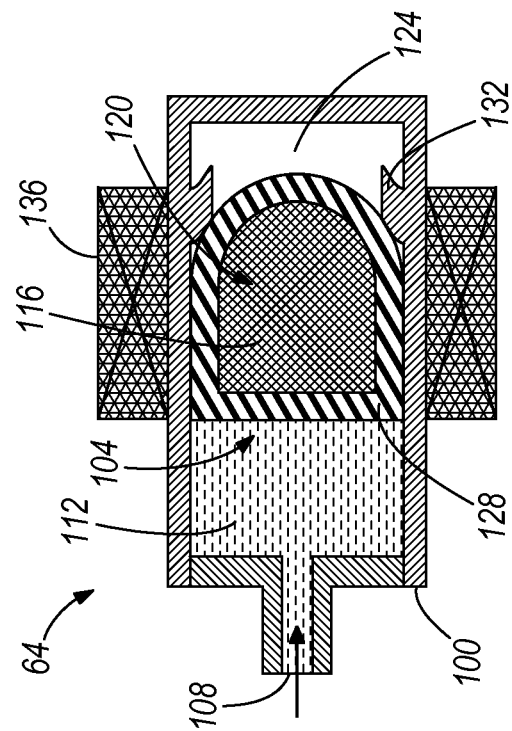
FIG. 4 is a cross-sectional view of a damper of the hydraulic unit in a first state.
Figure 5:
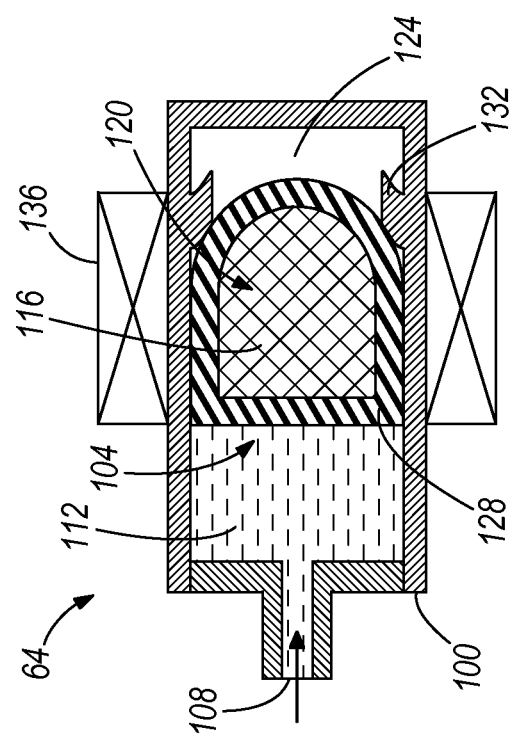
FIG. 5 is a cross-sectional view of the damper of FIG. 4 in a second state.

FIGS. 4 and 5 illustrate a first embodiment of the damper 64. The damper 64 includes a housing 100, such as a cylinder as illustrated, sized and configured to fit within the bore 92 in the body 84. The housing 100 defines a damping chamber 104 within the housing 100. The housing 100 has a port 108 for permitting flow of hydraulic fluid into and out of the housing 100 for damping. The housing 100 can be formed in any suitable manner from any suitable materials that will permit application of a magnetic field to the damping chamber 104, as will be discussed in more detail below. In other embodiments, the damping chamber 104 can be partly or wholly formed by the bore 92 in the body 84, instead of within a completely separate housing 100.

The illustrated damping chamber 104 is divided into a first chamber or chamber portion 112 that receives and houses hydraulic fluid, a second chamber or chamber portion 116 that houses a smart fluid such as magneto-rheological fluid 120, and a third chamber or chamber portion 124 that houses air. A resilient bladder 128 defines therein the second chamber 116 for containing the magneto-rheological fluid 120, and further partitions the damping chamber 104 into the three chambers 112, 116, and 124 to keep the hydraulic fluid, the magneto-rheological fluid 120, and the air all separate from one another. The magneto-rheological fluid-filled bladder 128 is tightly fit into the damping chamber 104 to sealingly separate the three chambers 112, 116, and 124. The interior wall of the housing 100 can include one or more locating tabs 132 that position the bladder 128 within the damping chamber 104.

The hydraulic unit 20 further includes an electro-magnetic coil 136 associated with the damper element 64 and selectively operable to apply a magnetic field to the magneto-rheological fluid 120 within the damper element 64. The housing 100 is preferably made of a material conducive for allowing the magnetic field to energize the magneto-rheological fluid 120. The electro-magnetic coil 136 can be of the same type used to selectively actuate the inlet and outlet valves 72, 76, which are magnetic valves. As shown in FIG. 3, an electro-magnetic coil 140 is associated with each of the inlet and outlet valves 72, 76 for control thereof in a conventional manner. More specifically, the vehicle's engine control unit (ECU) communicates with the controller 40 to selectively actuate or energize the electro-magnetic coils 140, and also to selectively actuate or energize the electro-magnetic coil 136 associated with each damper 64, as will be discussed further below. Because the electro-magnetic coil 136 can be controlled by the existing controller 140 and ECU, no additional controller need be added to operate the variable damper 64 of the invention.

FIG. 4 illustrates the damper 64 in its first state, providing a first damping characteristic, in which the viscosity of the magneto-rheological fluid 120 is a first viscosity. This first state is selected when system pressure (e.g., the pressure of the hydraulic fluid) is low and large damping capabilities are not needed. Hydraulic fluid in the first chamber portion 112 is damped by the expansion and contraction of the resilient bladder 128 as dictated by the magneto-rheological fluid 120 inside the bladder 128 (at the first viscosity), as well as by the air in the third chamber portion 124. The resiliency of the bladder 128 provides the biasing/return force, such that no additional biasing member is needed for the damper 64. The hydraulic fluid in the first chamber portion 112 is in direct contact with the outer surface of the bladder 128. In this first state, the electro-magnetic coil 136 is not energized, such that the first viscosity of the magneto-rheological fluid 120 is the natural, or un-energized viscosity of the magneto-rheological fluid 120.

FIG. 5 illustrates the damper 64 in its second state, providing a second damping characteristic, in which the viscosity of the magneto-rheological fluid 120 is changed to a second viscosity different from (i.e., higher than) the first viscosity. This second state is selected when system pressure (e.g., the pressure of the hydraulic fluid) is high, and increased damping capabilities are needed to dampen pressure peaks that might otherwise cause noise, vibration, and harshness issues. In this second state, the electro-magnetic coil 136 is energized, such that a magnetic field is applied to the magneto-rheological fluid 120, causing it to change from the first viscosity to the second, higher viscosity, as is known to occur with magneto-rheological fluid 120. The higher viscosity of the magneto-rheological fluid 120 makes the resilient bladder 128 less prone to expansion and contraction in response to the pressure pulsations of the high-pressure hydraulic fluid in contact therewith, thereby providing a second damping characteristic more suited for damping high-pressure peaks.

The damper 64 can be selectively transitioned, or configured and re-configured, between the first and second damping characteristic states by the ECU and/or the controller 40 working in conjunction with a pressure sensor 144 (shown schematically in FIG. 3) measuring the pressure of the hydraulic fluid in the braking system. It is to be understood that while the illustrated embodiment contemplates using the pressure sensor 144 and system pressure to determine which state is to be selected for the damper 64, other parameters can also be considered and used instead of, or in addition to system pressure to help select the appropriate damper state.

The pressure sensor 144 can be located within the body 84 or outside of the body 84 as desired to measure the system pressure at any suitable location. When the ECU and/or the controller 40 detects that the system pressure is within a low range, in which the first variable damping state is appropriate, the electro-magnetic coil 136 is not energized or is de-energized such that the magneto-rheological fluid 120 maintains its natural, first viscosity. When the ECU and/or the controller 40 detects that the system pressure is within a high range, in which the second variable damping state is appropriate, the electro-magnetic coil 136 is energized such that the magneto-rheological fluid 120 changes to its second, higher viscosity. The response time for the magneto-rheological fluid 120 to transition between the first and second viscosities is very short, such that overall response time is not limited by the fluid, but rather by the inductance of the electro-magnetic coil 136, the output impedance of the driving electronics, or other factors. Therefore, the variable damping characteristics of the damper 64 are highly responsive and well-suited to achieve optimum damping across the range of operating pressures experienced by the braking system.

In some embodiments, the damping characteristics of the damper 64 can be further selectively controlled to one or more intermediate states between the first and second states described above. For example, the magnetic field created by the electro-magnetic coil 136 might be varied to be greater than the un-energized first state (i.e., increase the magnetic field from the first state) and less than a fully-energized second state (i.e., decrease the magnetic filed from the second state) by varying the current provided to the electro-magnetic coil 136. The intermediate state(s) would provide damping characteristics between the first and second damping characteristics of the respective first and second states. The controller 40 can control the application of current to the electro-magnetic coil 136 to achieve the one or more intermediate states, thereby further continuously adjusting and optimizing damping, maximizing the pump efficiency, and ultimately optimizing the performance of the hydraulic unit 24 and braking system 20.

Figure 6:
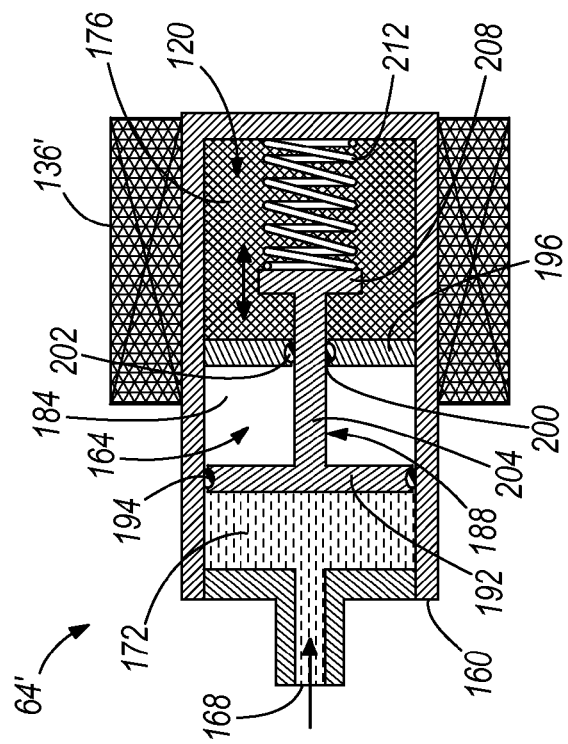
FIG. 6 is a cross-sectional view of an alternative damper of the hydraulic unit in a first state.
Figure 7:
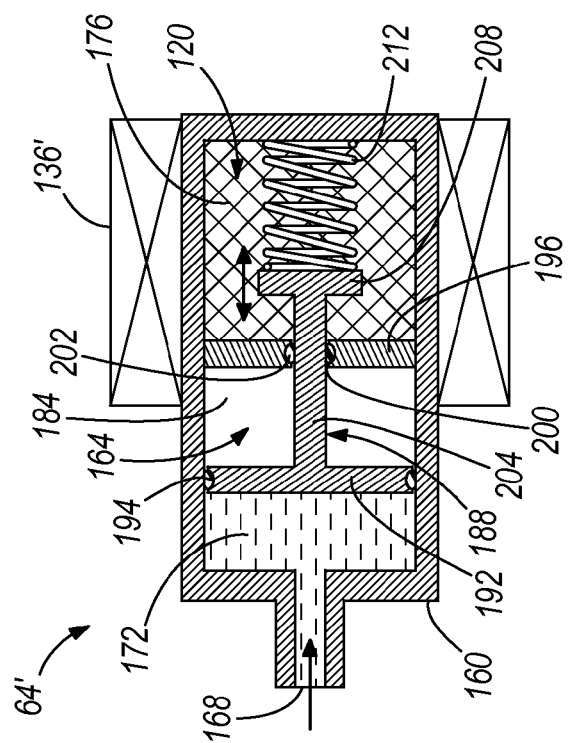
FIG. 7 is a cross-sectional view of the damper of FIG. 6 in a second state.

FIGS. 6 and 7 illustrate a second embodiment of the damper 64'. The damper 64' includes a housing in the form of a cylinder 160 sized and configured to fit within the bore 92 in the body 84. The cylinder 160 defines a damping chamber 164 within the cylinder 160. The cylinder 160 has a port 168 for permitting flow of hydraulic fluid into and out of the cylinder 160 for damping. The cylinder 160 can be formed in any suitable manner from any suitable materials that will permit application of a magnetic field to the damping chamber 164, as will be discussed in more detail below. In other embodiments, the damping chamber 164 can be partly or wholly formed by the bore 92 in the body 84, instead of within a completely separate cylinder 160.

The illustrated damping chamber 164 is divided into a first chamber or chamber portion 172 that receives and houses hydraulic fluid, a second chamber or chamber portion 176 that houses a magneto-rheological fluid 120, and a third chamber or chamber portion 184 that houses air. A piston 188 is provided in the damping chamber 164, and includes a first end or head 192 sealingly engaged (e.g., via a seal ring 194) with the inner surface of the cylinder 160 to separate or partition the first chamber portion 172 from the third chamber portion 184. The hydraulic fluid in the first chamber portion 172 is in fluid communication with and directly contacts the head 192 of the piston 188. The cylinder 160 further includes a wall 196 having a bore 200 that slidingly and sealingly (e.g., via a seal ring 202) receives a stem 204 of the piston 188. Together, the wall 196 and the stem 204 separate or partition the third chamber portion 184 from the second chamber portion 176. The three chambers 172, 176, and 184 are sealed from one another to keep the hydraulic fluid, the magneto-rheological fluid 120, and the air all separate from one another.

The piston 188 further includes a second end or tail 208 at the end of the stem 204 opposite the head 192. The tail 208 is housed in the second chamber portion 176 within the magneto-rheological fluid 120, and is thereby in direct fluid communication with the magneto-rheological fluid 120. A biasing member in the form of a spring 212 is engaged between the tail 208 and an inner surface of the cylinder 160 to bias the piston 188 toward the first chamber portion 172 and the port 168. The piston 188 is therefore also biased toward the hydraulic fluid and away from the second chamber 176 containing the magneto-rheological fluid 120.

The hydraulic unit 20 further includes an electro-magnetic coil 136' associated with the damper element 64' and selectively operable to apply a magnetic field to the magneto-rheological fluid 120 within the damper element 64'. The electro-magnetic coil 136' is the same as the electro-magnetic coil 136 described above with respect to the damper 64.

FIG. 6 illustrates the damper 64' in its first state, providing a first damping characteristic, in which the viscosity of the magneto-rheological fluid 120 is a first viscosity. This first state is selected when system pressure (e.g., the pressure of the hydraulic fluid) is low and large damping capabilities are not needed. Hydraulic fluid in the first chamber portion 172 is damped by the movement of the piston 188 as dictated by the magneto-rheological fluid 120 inside the second chamber portion 176 (at the first viscosity), as well as by the air and the biasing member 212 in the third chamber portion 184. The tail 208 is movable within the magneto-rheological fluid 120 as dictated by the first viscosity of the magneto-rheological fluid 120. In this first state, the electro-magnetic coil 136' is not energized, such that the first viscosity of the magneto-rheological fluid 120 is the natural, or un-energized viscosity of the magneto-rheological fluid 120.

FIG. 7 illustrates the damper 64' in its second state, providing a second damping characteristic, in which the viscosity of the magneto-rheological fluid 120 is changed to a second viscosity different from (i.e., higher than) the first viscosity. This second state is selected when system pressure (e.g., the pressure of the hydraulic fluid) is high, and increased damping capabilities are needed to dampen pressure peaks that might otherwise cause noise, vibration, and harshness issues. In this second state, the electro-magnetic coil 136' is energized, such that a magnetic field is applied to the magneto-rheological fluid 120, causing it to change from the first viscosity to the second, higher viscosity, as is known to occur with magneto-rheological fluid 120. The higher viscosity of the magneto-rheological fluid 120 makes the piston 188 harder to move by virtue of the tail 208 being positioned in the now higher viscosity magneto-rheological fluid 120. This greater resistance to movement in response to pressure pulsations of the high-pressure hydraulic fluid in contact with the piston 188 provides a second damping characteristic more suited for damping high-pressure peaks.

Like the damper 64, the damper 64' can be selectively transitioned, or configured and re-configured, between the first and second damping characteristic states by the ECU and/or the controller 40 working in conjunction with the pressure sensor 144 (shown schematically in FIG. 3) measuring the pressure of the hydraulic fluid in the brake system and/or other parameters. When the ECU and/or the controller 40 detects that the system pressure is within a low range, in which the first variable damping state is appropriate, the electro-magnetic coil 136' is not energized such that the magneto-rheological fluid 120 maintains its natural, first viscosity. When the ECU and/or the controller 40 detects that the system pressure is within a high range, in which the second variable damping state is appropriate, the electro-magnetic coil 136' is energized such that the magneto-rheological fluid 120 changes to its second, higher viscosity. The damper 64' can also be selectively transitioned to one or more intermediate damping characteristic states, as described above with respect to the damper 64, by controlling the magnetic field via the electro-magnetic coil 136'. The response time for the magneto-rheological fluid 120 to transition between the first, second, and any intermediate viscosities is very short, such that overall response time is not limited by the fluid, but rather by the inductance of the electro-magnetic coil 136', the output impedance of the driving electronics, and other factors. Therefore, the variable damping characteristics of the damper 64' are highly responsive and well-suited to achieve optimum damping across the range of operating pressures experienced by the braking system.

Figure 8:
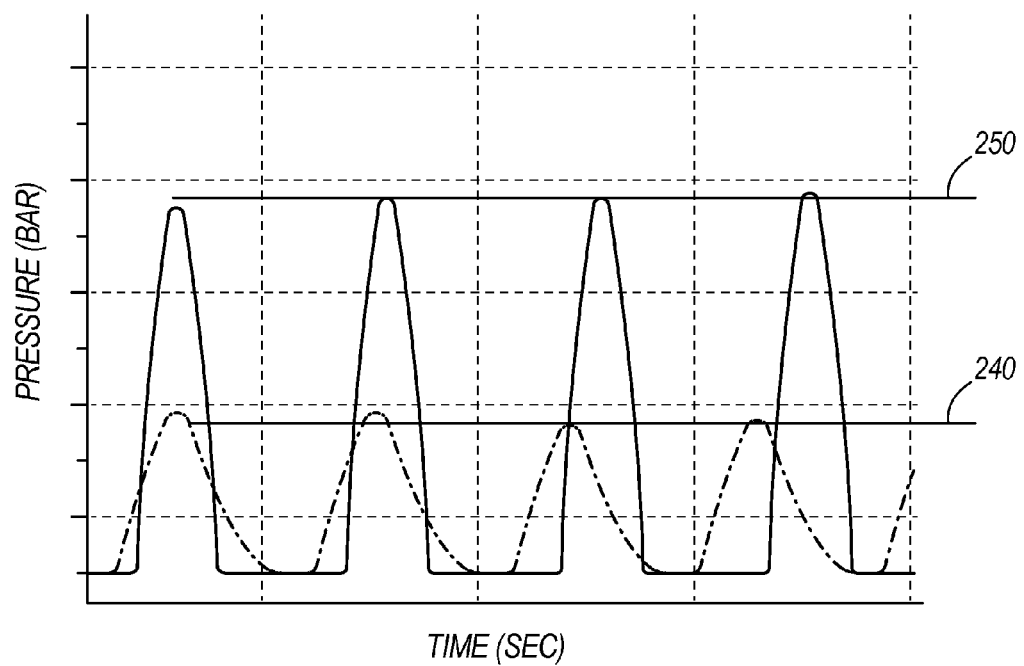
FIG. 8 is a graph illustrating the variable damping capability of the dampers embodying the invention.

FIG. 8 shows a graph of damping (e.g., pressure versus time) that illustrates the low pressure damping characteristic of the first state, as indicated by the line 240, and the high pressure damping characteristic of the second state, as indicated by the line 250. As discussed above, intermediate damping states can also be achieved and would similarly damp pressure peaks at a level between the lines 240 and 250. By using either of the dampers 64 or 64' as described above, variable damping is achieved, meaning that fluid damping can be adjusted continuously to optimize the NVH performance without impairing the performance of the hydraulic braking system. The pressure ranges or values at which the controller 40 and/or the ECU switch the damper between the first and second states can be selected and optimized for a particular braking system to achieve desired performance. Different braking systems may have different pressure ranges, and the controller 40 and/or the ECU can be programmed accordingly.

Various features and advantages of the invention are set forth in the following claims.

What is claimed is:

1. A hydraulic unit for a braking system, the hydraulic unit comprising:
    a body including at least one actuator-side port configured to be fluidly coupled with a master cylinder, and at least one brake-side port configured to be fluidly coupled with a wheel cylinder of a braking device;
    an inlet valve positioned in the body and operable between an open condition and a closed condition, the inlet valve being configured to direct hydraulic fluid from the actuator-side port to the wheel cylinder via the at least one brake-side port when the inlet valve is in the open condition;
    an outlet valve positioned in the body and operable between an open condition and a closed condition, the outlet valve being configured, when in the open condition, to relieve hydraulic fluid from the wheel cylinder via the at least one brake-side port; and
    a damper positioned in the body for damping pressure pulsations in the hydraulic fluid, the damper selectively operable in a first state having a first damping characteristic, and in a second state having a second damping characteristic different from the first damping characteristic;
    wherein the damper includes a chamber containing magneto-rheological fluid, and when in the first state, the magneto-rheological fluid has a first viscosity, and when in the second state, the magneto-rheological fluid has a second viscosity different from the first viscosity due to an application of a magnetic field to the magneto-rheological fluid; and
    wherein the damper includes a first chamber containing the hydraulic fluid, wherein the chamber containing the magneto-rheological fluid is a second chamber, and wherein the damper includes a third chamber containing air.

2. The hydraulic unit of claim 1, further comprising an electro-magnetic coil associated with the damper and selectively operable to apply the magnetic field to the magneto-rheological fluid.

3. The hydraulic unit of claim 2, wherein the inlet and outlet valves are magnetic valves, the hydraulic unit further comprising an electro-magnetic coil associated with each of the inlet valve and the outlet valve to selectively actuate the valves.

4. The hydraulic unit of claim 3, wherein the electro-magnetic coils associated with each of the damper, the inlet valve, and the outlet valve are controlled by a controller.

5. The hydraulic unit of claim 2, wherein the electro-magnetic coil is selectively operable in response to a signal from a pressure sensor measuring a pressure of the hydraulic fluid.

6. The hydraulic unit of claim 1, wherein the damper includes a resilient bladder defining the chamber containing the magneto-rheological fluid.

7. The hydraulic unit of claim 6, wherein the hydraulic fluid in the damper directly contacts the resilient bladder.

8. The hydraulic unit of claim 6, wherein the damper further includes a cylinder in which the resilient bladder is positioned.

9. The hydraulic unit of claim 1, wherein the damper includes a piston having a first end in fluid communication with the hydraulic fluid and a second end in fluid communication with the magneto-rheological fluid.

10. The hydraulic unit of claim 9, wherein the damper further includes a spring biasing the piston toward the hydraulic fluid and away from the chamber containing the magneto-rheological fluid.

11. The hydraulic unit of claim 9, wherein the damper further includes a cylinder in which the piston is positioned.

12. The hydraulic unit of claim 1, wherein the damper is further selectively operable in an intermediate state between the first and second states, the intermediate state providing a damping characteristic between the first and second damping characteristics.

13. The hydraulic unit of claim 12, wherein the damper is selectively operable from the second state to the intermediate state by reducing the magnetic field applied to the damper.

14. The hydraulic unit of claim 1, wherein the damper includes a cylinder received within a bore in the body.

15. A method of operating a hydraulic braking system, the system including a hydraulic unit with an inlet valve and an outlet valve operable to control a flow of hydraulic fluid to and from a wheel cylinder, the hydraulic unit further including a damper in communication with the hydraulic fluid, the method comprising:
- selectively activating the inlet valve and the outlet valve to control the flow of hydraulic fluid to and from the wheel cylinder;
- configuring the damper in a first state having a first damping characteristic; and
- selectively re-configuring the damper to a second state having a second damping characteristic based on a sensed pressure value of the hydraulic fluid;
- wherein the damper includes a chamber containing magneto-rheological fluid having a first viscosity in the first state, and wherein selectively re-configuring the damper to the second state includes changing the viscosity of the magneto-rheological fluid to a second viscosity different from the first viscosity by application of a magnetic field to the magneto-rheological fluid; and
- wherein the damper includes a first chamber containing the hydraulic fluid, wherein the chamber containing the magneto-rheological fluid is a second chamber, and wherein the damper includes a third chamber containing air.

16. The method of claim 15, wherein the hydraulic unit includes an electro-magnetic coil associated with the damper and wherein changing the viscosity to the second viscosity includes applying the magnetic field to the magneto-rheological fluid by energizing the electro-magnetic coil.

17. The method of claim 15, wherein configuring and selectively re-configuring the damper between the first and second states targets pressure peaks, which might cause noise, vibration, and harshness issues, for damping.

18. The method of claim 15, further including selectively re-configuring the damper to an intermediate state between the first and second states, the intermediate state providing a damping characteristic between the first and second damping characteristics.

19. The method of claim 18, wherein selectively re-configuring the damper from the second state to the intermediate state includes reducing a magnetic field applied to the damper.

* * * * *